(12) United States Patent
Ishii et al.

(10) Patent No.: US 9,855,987 B2
(45) Date of Patent: Jan. 2, 2018

(54) VEHICLE BODY FRAME STRUCTURE OF STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 15/035,191

(22) PCT Filed: Nov. 7, 2013

(86) PCT No.: PCT/JP2013/006570
§ 371 (c)(1),
(2) Date: May 6, 2016

(87) PCT Pub. No.: WO2015/068190
PCT Pub. Date: May 14, 2015

(65) Prior Publication Data
US 2016/0280304 A1    Sep. 29, 2016

(51) Int. Cl.
*B62K 11/04*    (2006.01)
*B62J 37/00*    (2006.01)
*B62K 21/20*    (2006.01)

(52) U.S. Cl.
CPC ............ *B62K 11/04* (2013.01); *B62J 37/00* (2013.01); *B62K 21/20* (2013.01)

(58) Field of Classification Search
CPC .......... B62K 11/04; B62K 11/02; B62K 19/18
See application file for complete search history.

(56) References Cited

U.S. PATENT DOCUMENTS

| 4,226,296 A | 10/1980 | Higaki |
| 4,480,712 A * | 11/1984 | Inoue ...................... B62M 7/02 |
| | | 123/559.1 |

(Continued)

FOREIGN PATENT DOCUMENTS

| EP | 1382521 A1 | 1/2004 |
| JP | S56148622 A | 11/1981 |

(Continued)

OTHER PUBLICATIONS

ISA Japanese Patent Office, Written Opinion of the International Searching Authority Issued in Application No. PCT/JP2013/006570, dated Feb. 10, 2014, WIPO, 7 pages.

(Continued)

*Primary Examiner* — Joseph M Rocca
*Assistant Examiner* — Michael R Stabley
(74) *Attorney, Agent, or Firm* — Alleman Hall Creasman & Tuttle LLP (57) ABSTRACT

A vehicle body frame structure of a straddle-type vehicle comprises a head pipe into which a steering shaft connected to a handle is inserted; and a pair of main frames extending rearward and outward in a vehicle width direction from the head pipe in such a manner that the main frames are spaced apart from each other in the vehicle width direction. Each of the main frames includes an upper frame extending rearward from an upper portion of the head pipe, and a lower frame extending rearward from a lower portion of the head pipe. Between the upper frame and the lower frame, a retraction space which is located inward in the vehicle width direction relative to an end portion of the handle in a turn operation state is provided.

17 Claims, 3 Drawing Sheets

(56) References Cited

U.S. PATENT DOCUMENTS

| | | | | |
|---|---|---|---|---|
| 5,782,313 | A * | 7/1998 | Kurawaki | B62K 25/24 180/219 |
| 5,921,339 | A * | 7/1999 | Matsuura | B62K 11/04 180/219 |
| 7,267,193 | B2 * | 9/2007 | Nagashii | B62K 11/04 180/219 |
| 7,404,463 | B2 * | 7/2008 | Saiki | B62K 19/30 180/229 |
| 7,490,689 | B2 * | 2/2009 | Seki | B62K 11/04 180/229 |
| 7,699,134 | B2 * | 4/2010 | Terashima | B62K 19/30 180/219 |
| 7,887,077 | B2 * | 2/2011 | Thiers | B60G 3/14 180/6.24 |
| 7,934,738 | B2 * | 5/2011 | Prielinger | B62K 11/04 180/219 |
| 8,408,575 | B2 * | 4/2013 | Kawai | B62K 11/04 280/281.1 |
| 8,453,781 | B2 * | 6/2013 | Kawai | B60T 8/3685 180/219 |
| 2011/0204613 | A1 * | 8/2011 | Aoki | B62J 35/00 280/830 |
| 2013/0009378 | A1 * | 1/2013 | Nagakubo | B60T 8/1706 280/274 |
| 2013/0270038 | A1 * | 10/2013 | Nitta | B62K 11/04 184/6 |
| 2014/0367183 | A1 * | 12/2014 | Matsuda | B62K 11/04 180/220 |

FOREIGN PATENT DOCUMENTS

| | | |
|---|---|---|
| JP | H01101282 A | 4/1989 |
| JP | H06004430 B | 1/1994 |
| JP | H08216960 A | 8/1996 |
| JP | H09095284 A | 4/1997 |
| JP | 2006096213 A | 4/2006 |
| JP | 2006347450 A | 12/2006 |
| JP | 2008068858 A | 3/2008 |
| WO | 2005111395 A2 | 11/2005 |
| WO | 2005111395 A3 | 5/2006 |

OTHER PUBLICATIONS

ISA Japanese Patent Office, International Search Report Issued in Application No. PCT/JP2013/006570, dated Feb. 10, 2014, WIPO, 4 pages.

European Patent Office, Extended European Search Report Issued in European Application No. 13897066.0, dated Jul. 6, 2017, Germany, 9 pages.

* cited by examiner

VEHICLE BODY FRAME STRUCTURE OF STRADDLE-TYPE VEHICLE

TECHNICAL FIELD

The present invention relates to a vehicle body frame structure of a straddle-type vehicle such as a motorcycle.

BACKGROUND ART

As disclosed in Patent Literature 1, a straddle-type vehicle includes main frames extending rearward and outward in a vehicle width direction from a head pipe in such a manner that the main frames are spaced apart from each other in the vehicle width direction, and various components such as a fuel tank are mounted to the main frames. For example, each of the main frames includes a plurality of rod-like frames coupled to each other to form a trellis structure (lattice structure).

CITATION LIST

Patent Literature

Patent Literature 1: EP No. 1382521 A1

SUMMARY OF INVENTION

Technical Problem

However, in the main frames disclosed in the above Patent Literature, a portion of the main frames which is in the vicinity of the head pipe is required to prevent interference with a handle. For this reason, the vehicle body frame is not designed flexibly.

In view of the above, an object of the present invention is to more flexibly design the vehicle body frame while maintaining a characteristic that a steering operation can be performed easily.

Solution to Problem

According to the present invention, a vehicle body frame structure of a straddle-type vehicle comprises a head pipe into which a steering shaft connected to a handle is inserted; and a pair of main frames extending rearward and outward in a vehicle width direction from the head pipe in such a manner that the main frames are spaced apart from each other in the vehicle width direction, wherein each of the main frames includes an upper frame extending rearward from an upper portion of the head pipe, and a lower frame extending rearward from a lower portion of the head pipe, and wherein between the upper frame and the lower frame, a retraction space which is located inward in the vehicle width direction relative to an end portion of the handle in a turn operation state is provided.

In accordance with this configuration, it becomes possible to prevent the handle in the turn operation state and the first of the hand gripping the handle from interfering with the upper frame, and the direction in which the upper frame extends and the direction in which the lower frame extends can be chosen more flexibly. Therefore, the frames can be placed above the handle. As a result, the vehicle body frame can be designed more flexibly.

The upper frame may extend in a rearward direction in such a manner that the upper frame protrudes farther upward than a virtual flat plane, the virtual flat plane extending through a connection portion of the upper frame and the head pipe and being perpendicular to a rotational axis of the steering shaft.

In accordance with this configuration, since the upper frame can be extended upward while preventing interference between the handle and the main frames, the lower surface of the upper frame is located at a high position, and the size of the space formed below the lower surface of the upper frame can be increased. For example, devices can be placed in this space. Thus, the devices can be laid out more flexibly.

The vehicle body frame structure of the straddle-type vehicle may comprise a coupling frame for coupling the upper frame to the lower frame in a vehicle length direction, and the coupling frame may be placed at a location at which the coupling frame does not interfere with the retraction space.

In accordance with this configuration, interference between the coupling frame and the handle can be prevented.

A portion of the upper frame which is adjacent to the retraction space may be located closer to a center of a vehicle body in the vehicle width direction than a portion of the lower frame which is adjacent to the retraction space is.

In accordance with this configuration, it becomes possible to easily place the rider's first in a region that is above the lower frame and outward in the vehicle width direction relative to the upper frame, when viewed from above. The rider's first does not get close to the upper frame while the rider is performing the turn operation of the handle. In this way, the rider can perform the turn operation without being forced to have a cramped posture.

Each of the main frames may include a trellis section extending continuously from the head pipe and a non-trellis section extending rearward from the trellis section, the trellis section may include the upper frame, the lower frame, and a coupling frame for coupling the upper frame to the lower frame, and the non-trellis section may extend linearly continuously from the upper frame.

In accordance with this configuration, the non-trellis section can be placed at a high position, and the device can be placed easily in the space.

In the vehicle body frame structure of the straddle-type vehicle, the device may be placed below the non-trellis section and protrude outward in the vehicle width direction from the non-trellis section.

In accordance with this configuration, the device can be placed by utilizing the non-trellis section placed at a high position.

The device may be an air-intake duct placed to extend from a region which is outside the main frame to a region which is inside the main frame.

In accordance with this configuration, since the upper frame is placed at a high position, the duct can be placed easily.

The device may be a supercharger unit which is placed below the upper frame and partially protrudes from the region which is inside the main frame to the region which is outside the main frame.

Terminal ends of first frames each of which is one of the upper frame and the lower frame may be located in front of terminal ends of second frames each of which is the other of the upper frame and the lower frame, and a device may be placed in a space which is formed between the second frames in the vehicle width direction and located rearward relative to the terminal ends of the first frames.

A vehicle body frame structure of a straddle-type vehicle of the present invention comprises a head pipe into which a steering shaft connected to a handle is inserted; and a pair of main frames extending rearward and outward in a vehicle width direction from the head pipe in such a manner that the main frames are spaced apart from each other in the vehicle width direction, wherein an upper surface of each of the main frames protrudes farther upward than a virtual flat plane, from a front end of the upper surface of the main frame toward a rear end of the upper surface of the main frame, the virtual flat plane extending through a connection portion of the upper surface of the main frame and the head pipe and being perpendicular to a rotational axis of the head pipe, and wherein an outer portion in the vehicle width direction of an outer surface of each of the main frames is formed with a retraction space which is located inward in the vehicle width direction, relative to an end portion of the handle in a turn operation state.

In accordance with this configuration, the steering operation can be performed more easily by utilizing the retraction space, and the vehicle body frame can be designed more flexibly.

Advantageous Effects of Invention

In accordance with the present invention, the vehicle body frame can be designed more flexibly while allowing the rider to easily perform the steering operation.

DESCRIPTION OF EMBODIMENTS

Hereinafter, the embodiment will be described with reference to the accompanying drawings. Throughout the drawings, the same or corresponding components are designated by the same reference characters, and will not be described repeatedly. The directions stated below are from the perspective of a rider straddling the straddle-type vehicle incorporating a vehicle body frame structure of the present invention. A vehicle height direction, a vehicle length direction, and a vehicle width direction correspond to a vertical direction, a forward and rearward direction, and a rightward and leftward direction, respectively. The terms "outside" and "outward" in the vehicle width direction refer to a side and a direction, respectively, which are more distant from the center of a vehicle body in the vehicle width direction. The terms "inside" and "inward" in the vehicle width direction refer to a side and a direction, respectively, which are closer to the center of the vehicle body in the vehicle width direction.

Figure 1:
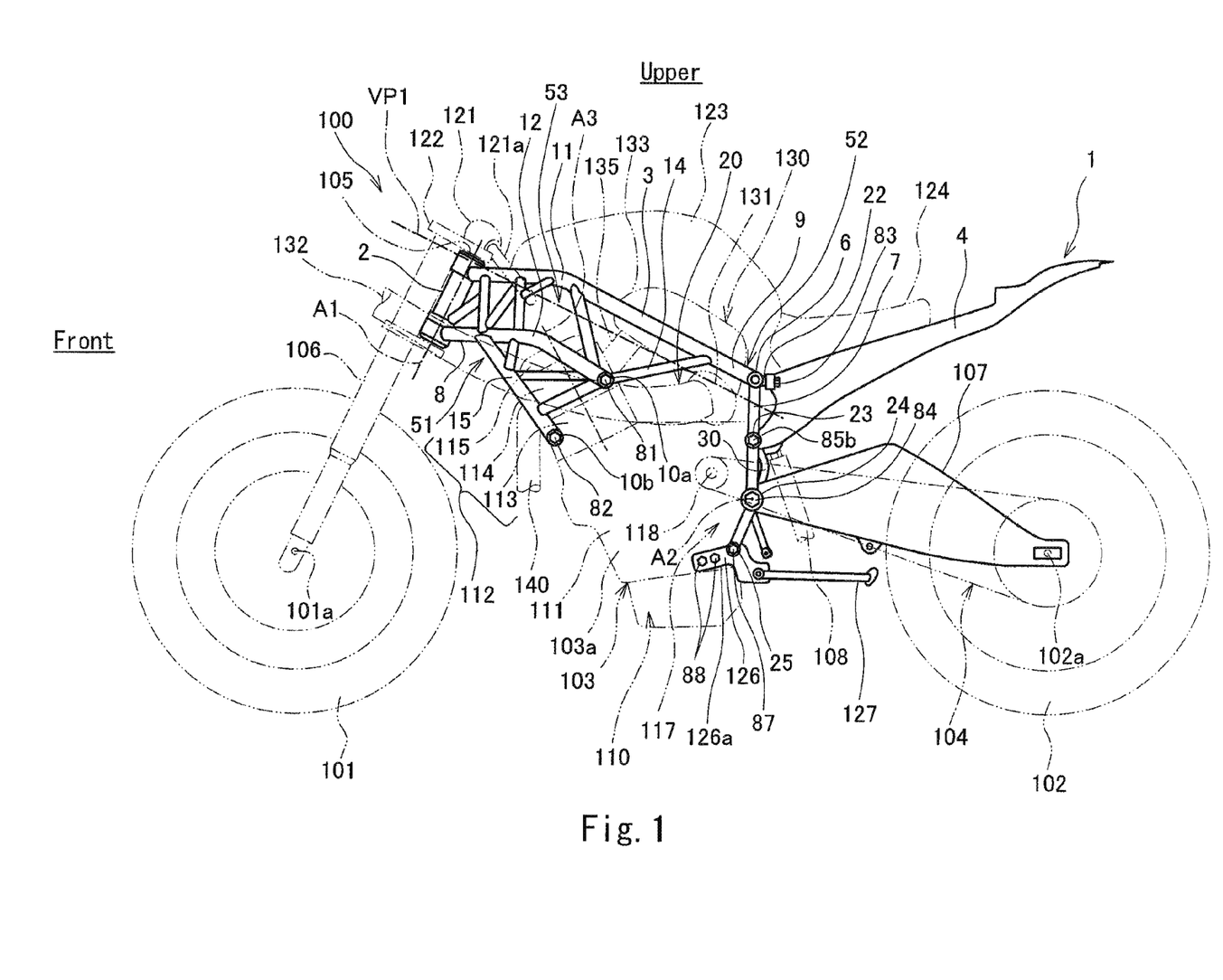
FIG. 1 is a left side view of a motorcycle which is an exemplary straddle-type vehicle into which a vehicle body frame structure according to an embodiment is incorporated.

A front wheel 101 is mounted to a vehicle body frame 1 via a steering component such as a steering shaft 105 in such a manner that the direction of the front wheel 101 is changeable around a steering axis A1. The steering axis A1 extends substantially upward and is inclined in a rearward direction to form a caster angle. In the present embodiment, the steering component includes a front fork 106. A front axle 101a of the front wheel 101 is rotatably mounted to the lower end portion of the front fork 106.

The rear wheel 102 is mounted to the vehicle body frame 1 via a swing arm 107 in such a manner that the rear wheel 102 is pivotable around a pivot axis A2. The pivot axis A2 extends in the vehicle width direction. The rear wheel 102 is placed rearward relative to the vehicle body frame 1. The swing arm 107 is pivotally mounted at a front end portion thereof to the vehicle body frame 1. The rear end portion of the swing arm 107 supports the right and left sides of a rear axle 102a of the rear wheel 102 in such a manner that the rear axle 102a is rotatable. A rear suspension 108 is placed between the vehicle body frame 1 and the swing arm 107 and connects the vehicle body frame 1 and the swing arm 107 to each other.

The rear wheel 102 is a drive wheel. The drive unit 103 includes a driving power source which generates rotational driving power. The driving power transmission mechanism 104 serves to transmit the rotational driving power output from the driving power source to the rear axle 102a. This allows the rear wheel 102 to be rotated with the rotational driving power generated by the driving power source. A casing member 103a of the drive unit 103 is mounted to the vehicle body frame 1.

The drive unit 103 includes an engine 110 which is an example of the driving power source. The drive unit 103 includes a crankcase 111 and a cylinder assembly 112 which are examples of the casing member 103a. The cylinder assembly 112 includes a cylinder block 113, a cylinder head 114, and a head cover 115. A crankshaft is rotatably supported on the crankcase 111. The cylinder assembly 112 accommodates therein a piston and a valve operating system and constitutes a combustion chamber. The cylinder block 113 is joined to the crankcase 111. The cylinder block 113 accommodates therein the piston in such a manner that the piston is reciprocatable in a direction of a cylinder axis A3. The cylinder head 114 is joined to the cylinder block 113 on an opposite side of the crankcase 111 in the direction of the cylinder axis A3, and constitutes the combustion chamber. The head cover 115 covers the cylinder head 114 on an opposite side of the cylinder block 113 in the direction of the cylinder axis A3. The head cover 115 and the cylinder head 114 accommodate therein the valve operating mechanism on the opposite side of the cylinder block 113.

The engine 110 is placed to extend horizontally, and the crankshaft of the engine 110 extends in the vehicle width direction. The engine 110 has an L-shape. The single cylinder assembly 112 is joined to the front upper portion of the crankcase 111, and the cylinder axis A3 extends upward from the front upper portion (more specifically, the cylinder axis A3 extends to be inclined slightly in a forward direction). The engine 110 is an in-line multi-cylinder engine. The cylinder axes A3 of the cylinders overlap with each other when viewed from a side. The cylinder assembly 112 is relatively elongated in the vehicle width direction.

The drive unit 103 includes a transmission as an example of a device which is integrated with the driving power source as a unit, and transmits the rotational driving power output from the driving power source to the rear wheel 102. The crankcase 111 protrudes rearward from the perspective of the cylinder assembly 112. The rear portion of the crankcase 111 constitutes a transmission case 117 which accommodates the transmission therein. The transmission changes the rotational driving power output from the driving power source, and outputs the changed rotational driving power to a transmission output shaft 118. The first end portion (e.g., left end portion) of the transmission output shaft 118 in the vehicle width direction protrudes outward in the vehicle width direction, from the side wall (e.g., left side wall) of the transmission case 117, the side wall being on a first side (one side) in the vehicle width direction.

The driving power transmission mechanism 104 is engaged with the first end portion (e.g., left end portion) of the transmission output shaft 118 in the vehicle width direction and the first end portion (e.g., left end portion) of the rear axle 102b in the vehicle width direction. The driving power transmission mechanism 104 extends in the vehicle length direction from the drive unit 103 toward the rear wheel 102. The driving power transmission mechanism 104 is placed on a first side (e.g., left side) in the vehicle width direction, with respect to a center line of the vehicle body in the vehicle width direction. The driving power transmission mechanism 104 is, for example, a chain transmission mechanism.

Next, the vehicle body frame structure according to the present embodiment which is suitably incorporated into the motorcycle 100 having the above-described configuration will be described. As shown in FIG. 1, the vehicle body frame 1 includes a head pipe 2, a main frame 3, and a rear frame 4.

Figure 3:
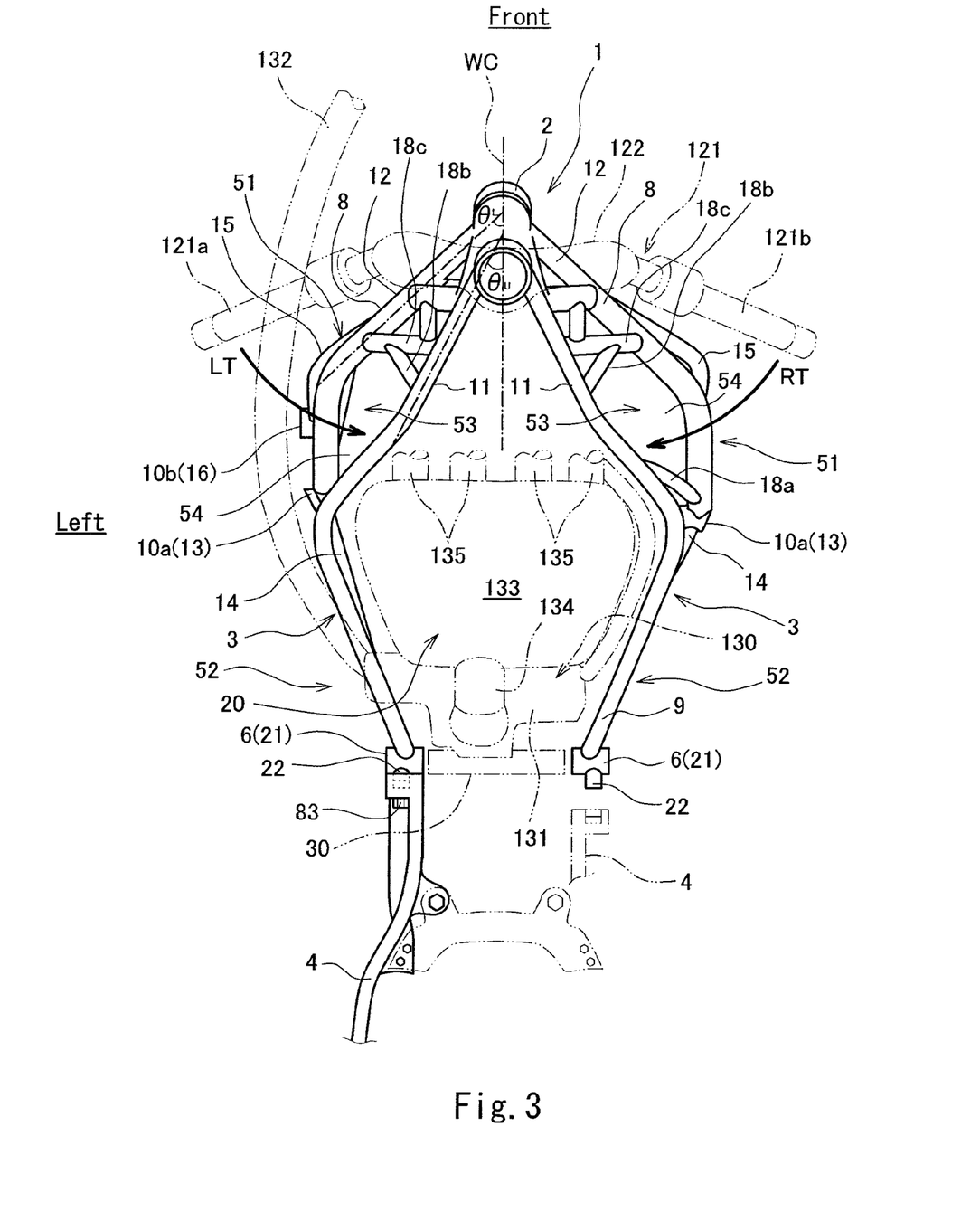
FIG. 3 is a plan view of the vehicle body frame structure of FIG. 1.

The head pipe 2 is made of metal (e.g., iron-based metal) and has a cylindrical shape with both ends opened. The head pipe 2 is located at the front end portion of the vehicle body frame 1. The above-described steering shaft 105 is connected to a handle 121 and inserted into the head pipe 2. The steering shaft 105 is placed coaxially with the head pipe 2. The common axis of the steering shaft 105 and of the head pipe 2 constitutes the above-described steering axis A1. The steering shaft 105 is supported by the head pipe 2 in such a manner that the steering shaft 105 is rotatable around the steering axis A1. The upper end of the steering shaft 105 is coupled to the lower surface of a bracket 122. The handle 121 is attached to the upper surface of the bracket 122. The handle 121 includes a pair of grips 121a, 121b (the right grip 121b is shown in FIG. 3) protruding to the left and the right, respectively. When the rider grips the grips 121a, 121b and rotates the handle 121, the steering shaft 105 is rotated around the steering axis A1, and thus the direction of the front wheel 101 is changed. The grips 121a, 121b extend to be inclined in a downward direction and in a rearward direction in such a manner that tip ends thereof are made lower and more rearward than the remaining portions are. The tip ends of the grips 121a, 121b overlap with the main frames 3, respectively, when viewed from the side.

The main frame 3 extends rearward from the head pipe 2. The rear frame 4 is connected to the main frame 3, and extends rearward from the main frame 3. In the present embodiment, the main frame 3 includes a pair of main frames placed in the vehicle width direction, while the rear frame 4 includes a pair of rear frames placed in the vehicle width direction. A fuel tank 123 is placed over the main frames 3 and located rearward relative to the handle 121. A seat 124 is placed over the rear frames 4 and located rearward relative to the fuel tank 123.

The pair of main frames 3 are welded to the head pipe 2, and extend rearward and outward in the vehicle width direction from the head pipe 2 in such a manner that the main frames 3 are spaced apart from each other in the vehicle width direction. Each of the main frames 3 includes a rearward extension section extending rearward from the head pipe 2, a bent section 6 located at the rear end of the rearward extension section, and a downward extension section 7 extending downward from the bent section 6. The rearward extension section includes a front frame member 8 including front and rear unit mounts 10b, 10a to which the drive unit 103 is mounted, and a rear frame member 9 located rearward relative to the front frame member 8. The bent section 6 is provided at the rear end portion of the rear frame member 9.

The rear end portion of the side wall of the cylinder assembly 112 (e.g., cylinder head 114) is joined to the rear unit mount 10a by a fastener member 81 such as a bolt. The front end portion of the side wall of the cylinder assembly 112 (e.g., cylinder block 113) is joined to the front unit mount 10b by a fastener member 82 such as a bolt. The fastener members 81, 82 are inserted into the mounts 10a, 10b, in an inward direction, from outside in the vehicle width direction, and engaged with the cylinder assembly 112.

The bracket 30 is placed between the pair of downward extension sections 7. The bracket 30 is coupled to the pair of downward extension sections 7 by use of fastener members 85b such as bolts. The bracket 30 is also coupled to the lower end portion of the right downward extension section 7 (see FIG. 2) by use of a fastener member (not shown) such as a bolt. A portion of each of the downward extension sections 7, into which the fastener member 85b is inserted, is constituted by the joint member 24. The lower end portion of the right downward extension section 7, into which the fastener member is inserted, is constituted by a joint member 25R (see FIG. 2).

The bracket 30 has a substantially rectangular plate shape. The two surfaces of the bracket 30 face the front and the rear, respectively. The left edge portion of the bracket 30 is joined to the left downward extension section 7 and the right edge portion of the bracket 30 is joined to the right downward extension section 7 (see FIG. 2). The rear portion of the casing member 103a (the rear portion of the crankcase 111, the transmission case 117) is coupled to the bracket 30 by use of a fastener member (not shown) such as a bolt. The rear surface of the casing member 103a (crankcase 111, transmission case 117) faces the front surface of the bracket 30. The fastener member is inserted into the bracket 30 in the forward direction, from the rear of the bracket 30, and is engaged with the rear portion of the casing member 103a.

The lower end portion of the left downward extension section 7 is coupled to a stand bracket 126 to which a side stand 127 is pivotally mounted, by use of a fastener member 87 such as a bolt. A portion of the left downward extension section 7, into which the fastener member 87 is inserted is constituted by a joint member 25L. The stand bracket 126 includes a forward protruding portion 126a which protrudes forward, and overlaps with the lower rear portion of the casing member 103a when viewed from the side. Fastener member 88 such as bolts are inserted into the forward protruding portion 126a, from outside in the vehicle width direction, and thus the casing member 103a is also fastened to the stand bracket 126.

The bracket 30 is used to support or mount the components placed in the rear portion of the motorcycle 100, as well as the drive unit 103. A pivot shaft (not shown) to which the swing arm 107 is pivotally mounted and which extends in the vehicle width direction is mounted to the bracket 30. The right and left end portions of the pivot shaft are joined to the pair of downward extension sections, respectively, by use of fastener members 84 such as bolts. The center axis of the pivot shaft constitutes the above-described pivot axis A2. A portion of each of the downward extension sections 7, into which the fastener member 84 is inserted, is constituted by the joint member 24. A suspension mounting section is provided at the upper edge portion of the bracket 30 and supports the upper end portion of the rear suspension 108 in such a manner that the rear suspension 108 is pivotable around an axis extending in the vehicle width direction. The lower portion of the front end of the rear frame 4 is fastened to the downward extension section 7, together with the bracket 30, by use of the fastener member 84. The bent joint member 21 is provided with a nut 22. The upper portion of the front end of the rear frame 4 is fastened to the bent section 6 in such a manner that a fastener member 83 is threadingly engaged with the nut 22.

Figure 2:
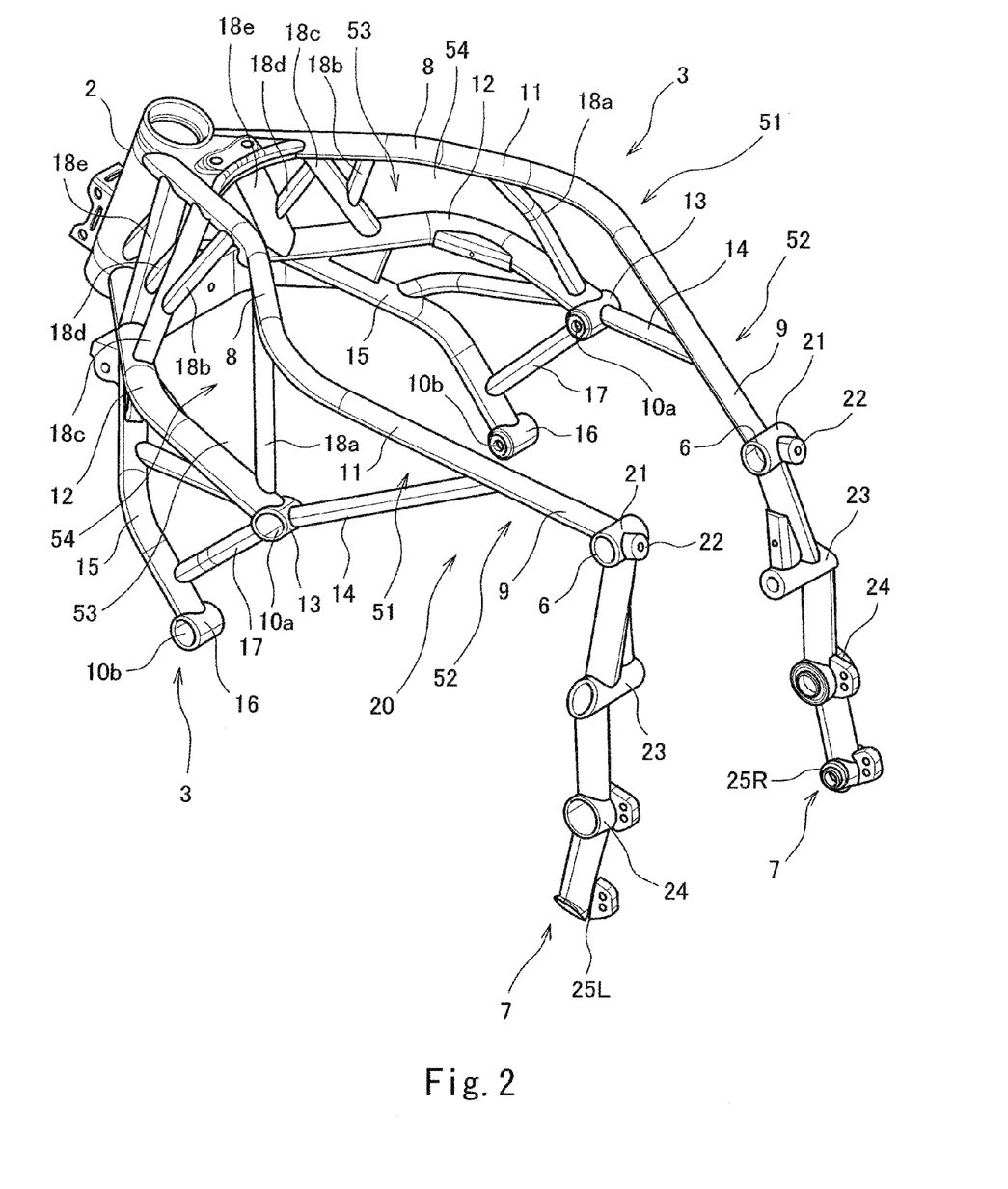
FIG. 2 is a perspective view of a head pipe and main frames.

The downward extension section 7 includes the above-described joint members 23, 24, 25R, and 25L which are placed below the bent joint member 21 and arranged to be spaced apart from each other in the vehicle height direction. The bent joint member 21 and the joint member 23 are connected to each other in the vehicle height direction by use of a pipe member. The joint member 24 and the joint member 25R or 25L are connected to each other in the vehicle height direction by use of a pipe member.

As described above, each of the main frames 3 includes the plurality of pipe members and the plurality of joint members which are coupled to each other, typically by welding. The pair of main frames 3 are firmly joined to each other via the head pipe 2. In other words, the main frames 3 do not include a cross member used to firmly join the rearward extension sections to each other, the bent sections 6 to each other, or the downward extension sections 7 to each other. For this reason, even if the main frames 3 have a dimension error due to welding distortion or the like, the main frames 3 can be easily corrected. For example, the main frames 3 can be easily corrected so that four fastening points set in the cylinder assembly 112 overlap with the corresponding unit mounts, respectively, in the vehicle width direction. The same applies to the components different from the drive unit 103. Therefore, the motorcycle 100 can be easily assembled.

FIG. 2 is a perspective view of the head pipe 2 and the main frames 3. As shown in FIG. 2, each of the pair of front frame members 8 includes an upper frame 11 extending rearward from the upper portion of the head pipe 2, and a lower frame 12 extending rearward from the lower portion of the head pipe 2. The upper frame 11 and the lower frame 12 are constituted by pipe members, respectively.

The terminal (rear) end of one of the upper frame 11 and the lower frame 12 is located in front of the terminal (rear) end of the other of the upper and lower frames 11, 12. In the present embodiment, the terminal end of the lower frame 12 is located in front of the terminal end of the upper frame 11. The rear frame member 9 extends rearward continuously from the upper frame 11. The pipe member constituting the upper frame 11 also constitutes the rear frame member 9. Thus, the upper frame 11 and the rear frame member 9 are integrated as a common pipe member. The rear end portion of the common pipe member is welded to the outer peripheral surface of the bent joint member 21.

The rear engine mount 10a is provided at the rear end portion of the lower frame 12. Specifically, the rear end portion of the pipe member constituting the lower frame 12 is welded to the outer peripheral surface of the above-described joint member 13. An upper gusset frame 14 is also welded to the joint member 13. The upper gusset frame 14 extends rearward and upward from the joint member 13, and is welded to the upper frame 11 or the rear frame member 9 (to be precise, the pipe member constituting the upper frame 11 or the rear frame member 9), from below.

The front frame member 8 includes an arm frame 15 extending downward and rearward from the front end portion of the lower frame 12. A front unit mount 10b is provided on the rear end of the arm frame 15. Specifically, the rear end portion of the pipe member constituting the arm frame 15 is welded to the outer peripheral surface of the above-described joint member 16. A lower gusset frame 17 is welded to the joint member 13. The lower gusset frame 17 extends forward and downward from the joint member 13 and is welded to the rear end portion of the arm frame 15 from above.

The front frame member 8 includes coupling frames 18a to 18e for coupling the upper frame 11 to the lower frame 12. These coupling frames extend in the vehicle height direction to connect the two frames which are spaced apart from each other in the vehicle height direction. Also, the coupling frames extend in the vehicle length direction, and connect in the vehicle length direction the two frames which are spaced apart from each other in the vehicle height direction. More specifically, each of the coupling frames is configured in such a manner that a weld joint located on a first end side is spaced apart in the vehicle length direction from a weld joint located on a second end side. Because of the presence of the coupling frames, the front frame member 8 is configured in such a manner that a plurality of triangles are arranged in the vehicle length direction between the upper frame 11 and the lower frame 12 or between the lower frame 12 and the arm frame 15. In this structure, the pair of front frame members 8 can ensure a sufficient stiffness required to mount the drive unit 103 (see FIG. 1), while obtaining flexibility without use of the cross member.

Since each of the front frame members 8 is configured as described above, each of the main frames 3 includes a trellis section 51 extending continuously from the head pipe 2 and a non-trellis section 52 extending rearward from the trellis section 51. The trellis section 51 is constituted by the front frame member 8 and extends rearward from the head pipe 2 to the upper and lower gusset frames 14, 17. The non-trellis section 52 is constituted by a single pipe member constituting the upper frame 11 and the rear frame member 9. The non-trellis section 52 does not have a lattice shape, and extends linearly rearward from the upper weld joint (to be precise, the rear upper end of the trellis section 51) of the upper gusset frame 14.

The trellis section 51 realizes a trellis structure (lattice structure). In other words, each of the pair of front frame members 8 includes the plurality of pipe members placed in different directions and coupled to each other, and the plurality of pipe members of one of the front frame members 8 and the plurality of pipe members of the other front frame member 8 are arranged along a pair of virtual planes placed to be spaced apart from each other in the vehicle width direction from the head pipe 2. The pipe members are coupled to each other to form a lattice shape on each of the virtual planes. The virtual planes extend substantially in the vehicle height direction and in the vehicle length direction. The virtual planes may be flat planes or curved planes which are twisted around axes extending in the vehicle height direction, in the vehicle length direction, in the vehicle width direction, and in directions which are inclined with respect to the vehicle height direction, the vehicle length direction, and the vehicle width direction.

In the present embodiment, the virtual planes protrude in the outward direction of the vehicle width direction, as they extend in the downward direction. Since the virtual planes protrude in the outward direction in this way, they are inclined in the outward direction of the vehicle width direction, as they extend in the downward direction. Or, the virtual planes are twisted around the axes extending in the vehicle length direction in such a manner that their upper portions are located inward in the vehicle width direction relative to their lower portions. In addition, the virtual planes protrude in the outward direction of the vehicle width direction, as they extend in the rearward direction. Since the virtual planes protrude in the outward direction in this way, they are inclined in the outward direction of the vehicle width direction, as they extend in the forward direction. Or, the virtual planes are twisted around the axes extending in the vehicle height direction in such a manner that their front portions are located inward in the vehicle width direction relative to their rear portions. Since the pipe members are arranged along the above-described virtual planes, these pipe members need not extend in the straight line shape and may be suitably curved. In the example of FIG. 2, the pipe members of the trellis section 51 are depicted together with R line, which defines the virtual plane.

The head pipe 2 defines the front side of the trellis section 51. The arm frame 15 (and the front end portion of the lower frame 12) defines the lower side of the trellis section 51. The upper and lower gusset frames 14, 17 define the rear side of the trellis section 51. The upper frame 11 defines the upper side of the trellis section 51. The rear frame member 9 integrated with the upper frame 11 defines the non-trellis section 52. The non-trellis section 52 is formed by extending the upper side of the trellis section 51 in the rearward direction from a location at which the upper side and rear side of the trellis section 51 cross each other.

Below the non-trellis section 52, a device space 20 which is widely opened to the side is formed. In a state in which the vehicle body frame 1 is incorporated into the motorcycle 100, the device space 20 is located above the crankcase 111 (see FIG. 1) and rearward relative to the cylinder assembly 112 (see FIG. 1). The device space 20 is widely opened to the side via an opening defined by the non-trellis section 52, the rear side of the trellis section 51 (to be precise, the upper gusset frame 14), and the downward extension section 7 (to be precise, the pipe member connecting the bent joint member 21 and the joint member 23 to each other). Any device may be placed in the device space 20. In the device space 20, a device which requires an elongated pipe, or a device which is elongated in the vehicle width direction is suitably placed. The pipe can be moved into and out of the device space 20 through the wide opening. Also, the end portion of the device in the vehicle width direction may be placed to protrude in the vehicle width direction.

FIG. 3 is a plan view of the vehicle frame structure of FIG. 1. As shown in FIGS. 1 and 3, in the present embodiment, as an example of the device placed in the device space 20, a supercharger unit 130 is placed in the device space 20. The supercharger unit 130 includes a supercharger 131 which supercharges air. The end portion of the supercharger in the vehicle width direction protrudes outward out of the device space, through the above-described opening of the device space. The motorcycle 100 further includes an air supply duct 132 which supplies the air to the supercharger 131. The upstream end of the air supply duct 132 is placed at, for example, the front portion of the motorcycle 100 so that the air can be easily taken in from outside by utilizing ram air. The air supply duct 132 extends in the vehicle length direction in a region that is outward in the vehicle width direction relative to the front frame member 8. The air supply duct 132 extends into the device space 20 in a location that is below the non-trellis section 52 (the rear frame member 9). The downstream end of the air supply duct 132 is connected to the supercharger 131.

The supercharger unit 130 includes an air supply chamber 133 into which the supercharged air (supplied air) is taken, and an upstream air supply passage 134 (see FIG. 3) through which the supplied air from the supercharger 131 is sent to the air supply chamber 133. The air supply chamber 133 contains a filter element (not shown) which cleans the supplied air, and functions as an air cleaner box. The clean part of the air supply chamber 133 is in communication with the above-described combustion chamber via a downstream air supply passage 135. The downstream air supply passage 135 extends into the casing member 103a via the rear wall of the cylinder head 114. A fuel is injected from an injector (not shown) to the interior of the downstream air supply passage 135 and/or the interior of the clean part of the air supply chamber 133.

An exhaust pipe 140 (see FIG. 1) extends downward from the front wall of the cylinder head 114, and is finally connected to a muffler (not shown) placed in the rear portion of the motorcycle 100. In a case where the supercharger 131 is a mechanical supercharger driven by the crankshaft, the layout of the exhaust pipe 140 is not complicated, and a region which is in the vicinity of the device space 20 is less affected by exhaust heat.

In addition to the supercharger unit 130, an ABS unit can be placed in the device space 20. The ABS unit includes a casing connected to one or more pipes through which brake oil is flowed. In a case where this casing is placed in the device space 20, the pipe can be moved into or out of the device space 20 through an opened region that is below the rear frame member 9.

In the present embodiment, the terminal end of each of the lower frames 12 is located in front of the terminal end of the upper frame 11. Therefore, the non-trellis section 52 or the rear frame member 9 is formed by extending the upper frame 11. The device space 20 is located rearward relative to the terminal ends of the lower frames 12. The device is accommodated in the device space 20 formed in the vehicle width direction between the upper frames and between the rear frame members 9 extending from the upper frames. Alternatively, the terminal end of each of the upper frames 11 may be located in front of the terminal end of the lower frame 12. In this case, the device may be accommodated in the space which is formed between the lower frames in the vehicle width direction and located rearward relative to the terminal ends of the upper frames 11. Further, the device space 20 may be opened to the side, above the lower frames 11.

In the present embodiment, each of the upper frames 11 extends in the vehicle length direction in such a manner that the upper frame 11 protrudes farther upward than a virtual flat plane VP1 (see FIG. 1), the virtual flat plane extending through a connection portion of the upper frame 11 and the head pipe 2 and being perpendicular to the steering axis A1. The upper frame 11 defines the upper side of the trellis section 51. The non-trellis section 52 is formed by extending the upper side (upper frame 11) in the rearward direction. In this structure, in the vicinity of the device space 20, a region surrounded by the pair of main frames 3 can be increased in the vehicle height direction. Therefore, even the device with a great height can be protected in the vehicle width direction by the pair of main frames 3. In addition, the lateral opening of the device space 20 can be extended in the upward direction. Thus, the device and the pipe can be placed in the device space 20 more flexibly.

In the example of FIG. 3, the handle 121 is in a neutral position at which the vehicle travels straight ahead. In a state in which the handle 121 is in the neutral position, the grips 121a, 121b are located on the left and right sides with respect to a center line WC of the vehicle body in the vehicle width direction, which extends through the head pipe 2, when viewed from above. In this structure, the end portions of the grips 121a, 121b are relatively distant from the main frames 3, respectively.

In a case where the rider wishes to turn the vehicle body to the left, the rider is required to rotate the handle 121 in a direction of an arrow LT (counterclockwise direction when viewed from above). At this time, the right grip 121b moves in the forward direction away from the main frame 3, while the left grip 121a moves in the rearward direction and in the inward direction of the vehicle width direction, from the neutral position. Therefore, the left grip 121a gets close to the left main frame 3, in particular, the front frame member 8 and the trellis section 51.

As described above, the grips 121a, 121b extend downward and rearward from the bracket 122, are not distant from the main frames 3 in the vehicle height direction, and overlap with the main frames 3 when viewed from the side (see FIG. 1). As described above, each of the main frames 3 has the trellis section 51 including the plurality of pipe members arranged on the virtual plane extending in the vehicle height direction. The upper frame 11 defining the upper side of the trellis section 51 protrudes farther upward than the virtual flat plane VP1. In this structure, the handle 121 tends to overlap with the main frame 3 when viewed from the side. In light of this, in the present embodiment, it is necessary to set a maximum steering angle of the vehicle body so that interference between the end portion of the left grip 121a and the main frame 3, or between the rider's first of the hand gripping the left grip 121a and the main frame 3, can be avoided.

In the neutral position, the left and right grips 121a, 121b are symmetric with respect to the center line WC of the vehicle body in the vehicle width direction. The pair of main frames 3 are substantially symmetric with respect to the center line WC of the vehicle body in the vehicle width direction. Therefore, the rider rotates the handle 121 in a direction of an arrow RT (clockwise direction when viewed from above) to turn the vehicle body to the right, as in the left turn. Hereinafter, a state in which the handle 121 is rotated from the neutral position to make the left turn, and a state in which the handle 121 is rotated from the neutral position to make the right turn, will be collectively referred to as "turn operation state."

Between each of the upper frames 11 and the corresponding lower frame 12, a retraction space 53 which is located inward in the vehicle width direction relative to the end portion of the handle 121 in the turn operation state is formed. The handle 121 in the turn operation state is accommodated in the retraction space 53. The upper frame 11 and the lower frame 12 constitute the front frame member 8 and the trellis section 51 as described above. Therefore, it may be said that the retraction space 53 is formed in the front frame member 8 or the trellis section 51.

As described above, the trellis section 51 is provided on the virtual plane protruding in the vehicle width direction as the virtual plane extends in the downward direction, and the upper frame 11 defines the upper side of the trellis section 51. In this structure, the upper frame 11 extends rearward from the head pipe 2 at a location that is inward in the vehicle width direction relative to the lower frame 12. The pair of main frames 3 extend rearward and outward in the vehicle width direction in such a manner that the main frames 3 are spaced apart from each other in the vehicle width direction. The front end portion of the upper frame 11 extends rearward from the head pipe 2 in such a manner that the front end portion is inclined in the outward direction of the vehicle width direction by an inclination angle $\theta_U$ with respect to the center line WC of the vehicle body in the vehicle width direction. In contrast, the front end portion of the lower frame 12 extends rearward from the head pipe 2 in such a manner that the front end portion is inclined in the outward direction of the vehicle width direction by an inclination angle $\theta_L$ with respect to the center line WC of the vehicle body in the vehicle width direction. The inclination angle is greater than the inclination angle $\theta_U$. The lower frame 12 extends rearward from the head pipe 2 and away from the upper frame 11 in the outward direction of the vehicle width direction. The retraction space 53 is formed in the trellis section 51, and located above the lower frame 12 and inward in the vehicle width direction relative to the lower frame 12.

Between the upper frame 11 and the lower frame 12, the coupling frames 18a to 18e are provided. The coupling frames 18a to 18e are placed while avoiding interference with the retraction space 53. In other words, the coupling frames 18a to 18e are placed in such a manner that they do not overlap with the end portions (grips 121a, 121b) of the handle 121 in the turn operation state when viewed from the side. In other words, the coupling frames 18a to 18e are placed in the vicinity of the retraction space 53, and a part of the coupling frames 18a to 18e defines the retraction space 53.

Turning back to FIG. 2, the coupling frames 18a to 18e are placed in the order of 18a, 18b, 18c, 18d, and 18e, from the rear. The coupling frames 18a, 18c, 18e extend forward and upward from the lower frame 12 and are welded to the upper frame 11. The coupling frame 18a is welded to the rear end portion of the lower frame 12, and makes an inverted triangle together with the upper frame 11 and the upper gusset frame 14. The coupling frame 18c is placed between the coupling frames 18a, 18c in such a manner that a distance between the coupling frame 18c and the coupling frame 18a is relatively long. The coupling frame 18b extends rearward and upward from the coupling frame 18c and is welded to the upper frame 11. An upper end weld joint is set to a location that is rearward relative to the coupling frame 18a. The coupling frame 18d extends rearward and upward from the coupling frame 18e, and is welded to the upper end portion of the coupling frame 18d. The coupling frames 18b to 18e make a plurality of triangles densely arranged in the vehicle length direction at the front portion of the trellis section 51. The center coupling frames 18b, 18c are placed to be relatively distant from the coupling frame 18a located on a rearmost side. In this structure, the coupling frames 18a to 18c make an opening 54 of a polygonal shape (in the illustrated example, a pentagon) which is relatively large in size in the vehicle length direction, together with the upper frame 18a and the lower frame 18b.

Turning back to FIG. 3, in the state in which the handle 121 is in the turn operation state, the end portion of the handle 121 (grip 121a, 121b) gets close to the opening 54. The retraction space 53 is in the vicinity of the opening 54. The coupling frames 18a to 18c define the retraction space 53. The coupling frame 18a and the coupling frame 18c are spaced apart from each other in the vehicle length direction so that the end portion of the handle 121 in the turn operation state gets close to the opening 54 and the handle 121 is accommodated into the retraction space 53 which is in the vicinity of the opening 54.

As described above, the vehicle body frame structure of the present embodiment comprises the head pipe 2 into which the steering shaft 105 connected to the handle 121 is inserted, and the pair of main frames 3 extending rearward and outward in the vehicle width direction in such a manner that the main frames 3 are spaced apart from each other in the vehicle width direction. Each of the main frames 3 includes the upper frame 11 extending rearward from the upper portion of the head pipe 2, and the lower frame 12 extending rearward from the lower portion of the head pipe 2. Between the upper frame 11 and the lower frame 12 in the vehicle height direction, the retraction space 53 which is located inward in the vehicle width direction relative to the end portion of the handle 121 in the turn operation state is formed.

In this structure, it becomes possible to prevent the handle 121 in the turn operation state and the first gripping the handle 121 (grip 121a, 121b) from interfering with the upper frame 11, and the rider can perform the steering operation more easily. Since the retraction space 53 can avoid interference between the first and the upper frame 11, the maximum steering angle can be increased. Further, the direction in which the upper frame 11 extends and the direction in which the lower frame 12 extends can be chosen flexibly. As a result, the vehicle body frame 1 can be designed more flexibly.

Each of the upper frames 11 extends in the vehicle length direction in such a manner that the upper frame 11 protrudes farther upward than the virtual flat plane VP1, the virtual flat plane extending through a connection portion of the upper frame 11 and the head pipe 2 and being perpendicular to the rotational axis (steering axis A1) of the steering shaft 105. In this structure, the lower surface of the upper frame 11 is located at a high position, and the size of the space formed below the lower surface of the upper frame 11 can be increased. This makes it possible to place the devices such as the supercharger unit 130 more flexibly. Since the upper frame 11 is located at the high position to place the devices more flexibly, the handle 121 in the turn operation state tends to overlap with the main frame 3 when viewed from the side. However, the retraction space 53 is provided as described above. As should be understood from the above, in the present embodiment, the steering operation can be performed more easily, a sufficient maximum steering angle can be obtained, the vehicle body frame can be designed more flexibly, and the devices can be placed more flexibly.

The vehicle body frame structure includes the coupling frames 18a to 18e for coupling the upper frame 11 to the lower frame 12 in the vehicle length direction. The coupling frames 18a to 18e are placed while avoiding interference with the retraction space 53. In this structure, a sufficient stiffness of the vehicle body frame can be obtained by using the coupling frames, and interference between the coupling frames and the handle 121 can be prevented so that the rider can perform the steering operation more easily.

A portion of the upper frame 11 which is adjacent to the retraction space 53 is located closer to the center of the vehicle body in the vehicle width direction than a portion of the lower frame 12 which is adjacent to the retraction space 53 is. This makes it easier to place the rider's first in a region that is above the lower frame 12 and outward in the vehicle width direction relative to the upper frame 11. The rider's first does not get close to the upper frame 11 while the rider is performing the turn operation. In this way, the rider can make a turn without being forced to have a cramped posture.

Each of the main frames 3 includes the trellis section 51 extending continuously from the head pipe 2 and the non-trellis section 52 extending rearward from the trellis section 51. The trellis section 51 includes the upper frame 11, the lower frame 12, and the coupling frames 18a to 18e for coupling the upper frame 11 to the lower frame 12. The non-trellis structure 52 extends linearly continuously from the upper frame 11. In this structure, the non-trellis section 52 can be placed at a high position, and the devices can be placed easily.

At least the front portion of the upper frame 11 and the front portion of the lower frame 12, or more specifically, portions facing the retraction space 53, are preferably exposed without being covered by a cowling. Thereby, the cowling does not fill in the retraction space 53, or in other words, reduction of the size of the retraction space 53 due to the cowling does not occur. Therefore, a portion of the vehicle body frame 1 can be placed above a region through which the handle 121 is moved, while preventing interference between the handle 121 and the vehicle body frame 1.

The vehicle body frame 1 has the trellis structure in front of and above the retraction space 53. This makes it possible to prevent reduction of stiffness in a region which is in the vicinity of the head pipe 2 to which a force tends to be applied, while reducing the weight.

The opening 54 formed in the retraction space 53 has a size greater than that of the opening 54 formed between the frames, in front of the retraction space 53. Specifically, when viewed from the side, the opening 54 formed in the retraction space 53 has a dimension greater than that of the opening 54 formed between the frames and located in front of the retraction space 53, the dimension being in a direction in which the virtual flat plane VP1 extends. The upper end of the retraction space 53 is located above the virtual flat plane VP1 when viewed from the side, while the lower end of the retraction space 53 is located below the virtual flat plane VP1 when viewed from the side. This makes it possible to more reliably prevent interference between the rider's first and the frame.

The embodiment of the present invention has been described, and the above-described configuration can be changed within the scope of the invention.

INDUSTRIAL APPLICABILITY

In accordance with the present invention, it becomes possible to obtain an advantage that the vehicle body frame can be designed more flexibly while allowing the rider to perform a steering operation easily. The present invention is widely applicable to the straddle-type vehicle such as the motorcycle and an all-terrain vehicle (ATV).

LIST OF REFERENCE CHARACTERS 1 vehicle body frame
2 head pipe
3 main frame
11 upper frame
12 lower frame
18a to 18f coupling frame
51 trellis section
52 non-trellis section
53 retraction space
100 motorcycle
105 steering shaft
121 handle
130 supercharger unit
131 supercharger
132 air supply duct
A1 steering axis
VP1 virtual flat plane

The invention claimed is:

1. A vehicle body frame structure of a straddle vehicle, the vehicle body frame structure comprising:
   a head pipe into which a steering shaft connected to a handle is inserted; and
   a pair of main frames extending rearward and outward in a vehicle width direction from the head pipe in such a manner that the main frames are spaced apart from each other in the vehicle width direction,
   wherein each of the main frames includes an upper frame extending rearward from an upper portion of the head pipe, and a lower frame extending rearward from a lower portion of the head pipe,
   wherein the upper frame includes a first portion that extends rearward from the head pipe and is inclined outward in the vehicle width direction in a plan view and a second portion that extends rearward from the first portion and is more inclined outward in the vehicle width direction than the first portion in a plan view, and
   wherein between the second portion of the upper frame and the lower frame, a handle retraction space which is located inward in the vehicle width direction relative to an end portion of the handle in a turn operation state is provided.

2. A vehicle body frame structure of a straddle vehicle, the vehicle body frame structure comprising:
   a head pipe into which a steering shaft connected to a handle is inserted; and
   a pair of main frames extending rearward and outward in a vehicle width direction from the head pipe in such a manner that the main frames are spaced apart from each other in the vehicle width direction,
   wherein each of the main frames includes an upper frame extending rearward from an upper portion of the head pipe, and a lower frame extending rearward from a lower portion of the head pipe,
   wherein between the upper frame and the lower frame, a handle retraction space that is located inward in the vehicle width direction relative to an end portion of the handle in a turn operation state is provided, and
   wherein the upper frame extends in a vehicle length direction in such a manner that the upper frame protrudes farther upward than a virtual flat plane extending through a connection portion of the upper frame and the head pipe and being perpendicular to a rotational axis of the steering shaft.

3. The vehicle body frame structure of the straddle vehicle according to claim 1, comprising:
   a coupling frame for coupling the upper frame to the lower frame in a vehicle length direction,
   wherein the coupling frame is placed at a location at which the coupling frame does not interfere with the retraction space.

4. The vehicle body frame structure of the straddle vehicle according to claim 1,
   wherein a portion of the upper frame which is adjacent to the retraction space is located closer to a center of a vehicle body in the vehicle width direction than a portion of the lower frame which is adjacent to the retraction space is.

5. The vehicle body frame structure of the straddle vehicle according to claim 1,
   wherein each of the main frames includes a trellis section extending continuously from the head pipe and a non-trellis section extending rearward from the trellis section,
   wherein the trellis section includes the upper frame, the lower frame, and a coupling frame for coupling the upper frame to the lower frame, and
   wherein the non-trellis section extends linearly continuously from the upper frame.

6. The vehicle body frame structure of the straddle vehicle according to claim 5,
   wherein a device is placed below the non-trellis section and protrudes outward in the vehicle width direction from the non-trellis section.

7. The vehicle body frame structure of the straddle vehicle according to claim 6,
   wherein the device is an air-intake duct placed to extend from a region which is outside the main frame to a region which is inside the main frame.

8. The vehicle body frame structure of the straddle vehicle according to claim 6,
   wherein the device is a supercharger unit which is placed below the upper frame and partially protrudes from the region which is inside the main frame to the region which is outside the main frame.

9. The vehicle body frame structure of the straddle vehicle according to claim 1,
   wherein terminal ends of first frames, each of which is one of the upper frame and the lower frame, are located in front of terminal ends of second frames, each of which is the other of the upper frame and the lower frame, and
   wherein a device is placed in a space which is formed between the second frames in the vehicle width direction and located rearward relative to the terminal ends of the first frames.

10. A vehicle body frame structure of a straddle vehicle, the vehicle body frame structure comprising:
    a head pipe into which a steering shaft connected to a handle is inserted; and
    a pair of main frames extending rearward and outward in a vehicle width direction from the head pipe in such a manner that the main frames are spaced apart from each other in the vehicle width direction,
    wherein an upper surface of each of the main frames protrudes farther upward than a virtual flat plane, from a front end of the upper surface of the main frame toward a rear end of the upper surface of the main frame, the virtual flat plane extending through a connection portion of the upper surface of the main frame and the head pipe and being perpendicular to a rotational axis of the head pipe, and
    wherein an outer portion in the vehicle width direction, of an outer surface of each of the main frames, is formed with a handle retraction space which is located inward in the vehicle width direction, relative to an end portion of the handle in a turn operation state.

11. The vehicle body frame structure of the straddle vehicle according to claim 1,
    wherein the end portion of the handle in the turn operation state is located below the upper frame.

12. The vehicle body frame structure of the straddle vehicle according to claim 1,
    wherein the lower frame is placed outward in the vehicle width direction relative to the upper frame.

13. The vehicle body frame structure of the straddle vehicle according to claim 1,
    wherein each of the main frames includes a plurality of coupling frames for vertically coupling the upper frame to the lower frame, wherein the plurality of coupling frames are arranged to be spaced apart from each other in a forward and rearward direction, and wherein the retraction space is provided at a location where the lower frame is located outward in the vehicle width direction relative to the upper frame and the plurality of coupling frames are arranged to be spaced apart from each other in the forward and rearward direction.

14. The vehicle body frame structure of the straddle vehicle according to claim 1,
wherein the end portion of the handle in the turn operation state is placed between the upper frame and the lower frame when viewed from a side.

15. The vehicle body frame structure of the straddle vehicle according to claim 1,
wherein the end portion of the handle in a neutral position overlaps with the pair of main frames when viewed from a side.

16. The vehicle body frame structure of the straddle vehicle according to claim 1, wherein a rotational axis of the steering shaft is inclined in a rearward direction.

17. The vehicle body frame structure of the straddle vehicle according to claim 1,
wherein a first inclination angle of a front end portion of the upper frame with respect to a center of a vehicle body in the vehicle width direction is smaller than a second inclination angle of a front end portion of the lower frame with respect to the center of the vehicle body in the vehicle width direction.

* * * * *